(12) United States Patent
Swackhamer

(10) Patent No.: US 10,735,442 B1
(45) Date of Patent: Aug. 4, 2020

(54) NETWORK SECURITY ANALYSIS AND MALWARE DETECTION USING MULTIPLE TYPES OF MALWARE INFORMATION

(71) Applicant: Target Brands, Inc., Minneapolis, MN (US)

(72) Inventor: Allen M. Swackhamer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 154 days.

(21) Appl. No.: 15/997,455

(22) Filed: Jun. 4, 2018

(51) Int. Cl.
*G06F 21/00* (2013.01)
*H04L 29/06* (2006.01)
*G06F 3/0483* (2013.01)
*G06F 3/0482* (2013.01)
*G06F 16/951* (2019.01)

(52) U.S. Cl.
CPC ........ *H04L 63/1416* (2013.01); *G06F 3/0482* (2013.01); *G06F 3/0483* (2013.01); *G06F 16/951* (2019.01); *H04L 63/145* (2013.01)

(58) Field of Classification Search
None
See application file for complete search history.

(56) References Cited

U.S. PATENT DOCUMENTS

| | | | |
|---|---|---|---|
| 7,529,727 B2 | 5/2009 | Arning et al. | |
| 7,827,611 B2 * | 11/2010 | Kouznetsov | G06F 21/56 726/24 |
| 8,635,694 B2 | 1/2014 | Malyshev et al. | |
| 9,021,260 B1 | 4/2015 | Falk et al. | |
| 9,038,177 B1 | 5/2015 | Tierney | |
| 9,069,957 B2 | 6/2015 | Tuvell et al. | |
| 9,609,011 B2 * | 3/2017 | Muddu | H04L 41/22 |
| 2013/0326625 A1 * | 12/2013 | Anderson | G06F 21/56 726/23 |
| 2014/0082730 A1 * | 3/2014 | Vashist | H04L 63/1416 726/23 |
| 2014/0359761 A1 | 12/2014 | Altman et al. | |
| 2015/0244733 A1 | 8/2015 | Mohaisen et al. | |
| 2016/0224676 A1 * | 8/2016 | Miller | G06F 40/177 |
| 2017/0063888 A1 | 3/2017 | Moddu et al. | |
| 2017/0244735 A1 * | 8/2017 | Visbal | G06F 16/24578 |
| 2017/0251003 A1 * | 8/2017 | Rostami-Hesarsorkh | H04L 63/1425 |
| 2017/0286671 A1 * | 10/2017 | Chari | G06F 21/552 |

OTHER PUBLICATIONS

U.S. Appl. No. 15/997,479, filed Jun. 4, 2018, Swackhamer.
U.S. Appl. No. 15/997,437, filed Jun. 4, 2018, Swackhamer.

(Continued)

*Primary Examiner* — Maung T Lwin
(74) *Attorney, Agent, or Firm* — Fish & Richardson P.C.

(57) ABSTRACT

User interfaces are generated by operations that include receive and store formatted static data and dynamic data. A first query is received, and first response data is selected. A user interface is generated containing the first response data and the user interface is displayed. An indication of user selection is received. A second query is generated and second response data is selected. The user interface is updated to a second user interface, which is displayed.

15 Claims, 9 Drawing Sheets

(56) References Cited

OTHER PUBLICATIONS aws.amazon.cpm [online] Denney. G., "How to Visualize and Refine Your Network's Security by Adding Security Group IDs to Your VPC Flow Logs," May 3, 2017, Retrieved Jul. 21, 2017, Retrieved online: URL <https://aws.amazon.com/blogs/security/how-to-visualize-and-refine-your-networks-security-by-adding-security-group-ids-to-your-vpc-flow-logs/>, 18 pages.

elastic.co [online] Paquette. M., "Using Machine Learning and Elasticsearch for Security Analytics: A Deep Dive," May 17, 2017, Retrieved Jul. 21, 2017, Retrieved online: URL <https://www.elastic.co/blog/using-machine-learning-and-elasticsearch-for-security-analytics-deep-dive>, 9 pages.

elastic.co [online] Smith. T., "Integrating Bro IDS with the elastic stack," Mar. 17, 2016, Retrieved Jul. 21, 2017, Retrieved online: URL <https://www.elastic.co/blog/bro-ids-elastic-stack>, 11 pages.

gartner.com [online] Chuvakin. A., "How to Make Better Threat Intelligence Out of Threat Intelligence Data?," Feb. 19, 2014, Retrieved Aug. 1, 2018, Retrieved Online: URL <https://blogs.gartner.com/anton-chuvakin/2014/02/19/how-to-make-better-threat-intelligence-out-of-threat-intelligence-data/>, 4 pages.

splunk.com [online] Patel. B., "Enriching threat feeds with WHOIS information," May 2, 2016, Retrieved Aug. 1, 2018, Retrieved Online: URL <https://www.splunk.com/blog/2016/05/02/enriching-threat-feeds-with-whois-information-splunk.html>, 9 pages.

Svajcer. V., "Building a malware lab in the age of big data," *Virus Bulletin Conference.*, Sep. 2015, 12 pages.

symantec.com [online] "Data Enrichment," Retrieved Aug. 1, 2018, Retrieved Online: URL <https://origin-symwisedownload.symantec.com/resources/webguides/security_analytics/7.2/platform_webguide/desktop/ENG/Data_Enrichment/Providers/_enrichment_providers.htm>, 4 pages.

Wolff and Chisholm., "High dimensional visualization of malware families," *RSA Conference.*, Jul. 22-24, 2015, 34 pages.

\* cited by examiner

NETWORK SECURITY ANALYSIS AND MALWARE DETECTION USING MULTIPLE TYPES OF MALWARE INFORMATION

The present document generally relates to computer network security.

BACKGROUND

Computer networks include hardware and software that allow nodes on the network to share data with other nodes. Network security includes policies, practices, and devices adopted to prevent and monitor unwanted access, misuse, modification, or attacks on computer networks and network-accessible resources. Malware includes software that preforms malicious actions on one or more nodes within a network, such as software with malicious code that is executed/interpreted by nodes within a network. Malware can expose not only the machine that is executing/interpreting the malicious code to vulnerabilities (e.g., cause the machine to download more malicious code, cause machine to transmit sensitive information to an external system/computer, cause machine to destroy/encrypt data stored on the machine), but it can expose other nodes within the network to malicious attacks. For example, nodes within a network may trust communications and instructions from other nodes within the network. However, once compromised, nodes may not be able to readily differentiate between secure (uncompromised) nodes and compromised nodes running malicious code. Detecting and preventing malware within a network is a constant challenge as software running on devices is constantly changing, creating possible new security vulnerabilities, and as malware evolves in attempts to exploit those vulnerabilities.

SUMMARY

This document generally describes computer systems, processes, program products, and devices for more accurately and effectively cataloging and classifying malware encountered by a network security system. This information can be provided to a user in an interface that allows the user to explore the information in an efficient and direct way. For example, it can often be a challenge for network security analysts to understand relationships between different malware, particularly when the similar or related malware attacks are intentionally obfuscated from each other to try to thwart network security analysts from proactively blocking or responding to related attacks. The computer systems, process, program products, and devices described throughout this document can assist network security analysts (and others) by more effectively cataloging and classifying malware that is encountered, including grouping together related/similar malware instances where the relationship/similarity would have otherwise been obfuscated and difficult for an analyst to detect. User interfaces can be provided so that analysts can readily view and act on malware classification and cataloging, including deploying security updates to network systems and/or user devices within a network.

User interfaces with specific combinations graphical elements can be generated to effectively present network security information in a way that permits users, such as network security analysts, to readily identify relevant details among large and disparate data sets. For example, a user interface can be created that displays information, including displaying records of data with each record having a group of fields and values shown for each field, including some aggregate data (e.g., charts and graphs) that can help the viewer understand the information in the records. Such an example user interface can be configured to be interactive to allow a user to pivot from the currently displayed data to other data that is related to currently displayed information or is otherwise of interest to the user. For example, when a user is reviewing information about a particular security event, the user may formulate a hypothesis about a few fields being important. To test their hypothesis, the user may request a pivot on those field by clicking or otherwise marking those fields. In response to the user marking those fields, the system can automatically generate a query for other entries in a data store that are the same or similar. The system can execute the query to find new data to be displayed in the user interface, and can animate the user interface to update the displayed information with the query results. As such, the user interface can allow users to quickly and efficiently navigate large sets of security data that have been collected from disparate data sources.

In some implementations, systems for creation of a database can include a datastore. The datastore can be configured to receive and store formatted static data, the formatted static data recording information about malware generated during static analysis of malware; receive and store formatted dynamic data, the formatted dynamic data recording information about malware generated during dynamic analysis of malware; receive a first query; select first response data for the first query from the stored formatted static data and from the stored formatted dynamic data; generate a user interface containing the first response data, the user interface configured to display a collection of records of the first response data, each record containing a plurality of fields of information, the user interface further configured to display aggregate information the represents aggregations of the collection of records; display the user interface; receiving an indication of user selection of a plurality of the displayed fields of information; responsive to receiving the indication, automatically generate a second query that specifies a search request for additional records that contain fields having the same information as the user selected fields; responsive to automatically generating the second query, automatically select second response data for the second query from the stored formatted static data and from the stored formatted dynamic data; responsive to automatically selecting the second response data, update the user interface to contain the second data, the updated user interfaced configured to display a second collection of records of the second response data, the second user interface further configured to update the displayed aggregate information for the second information; and display the second user interface.

In some implementations, methods can be performed by data processing apparatuses. The method includes receiving and store formatted static data, the formatted static data recording information about malware generated during static analysis of malware; receiving and store formatted dynamic data, the formatted dynamic data recording information about malware generated during dynamic analysis of malware; receiving a first query; selecting first response data for the first query from the stored formatted static data and from the stored formatted dynamic data; generating a user interface containing the first response data, the user interface configured to display a collection of records of the first response data, each record containing a plurality of fields of information, the user interface further configured to display aggregate information the represents aggregations of the collection of records; displaying the user interface; receiving an indication of user selection of a plurality of the displayed fields of information; responsive to receiving the indication, automatically generating a second query that specifies a search request for additional records that contain fields having the same information as the user selected fields; responsive to automatically generating the second query, automatically selecting second response data for the second query from the stored formatted static data and from the stored formatted dynamic data; responsive to automatically selecting the second response data, updating the user interface to contain the second data, the updated user interfaced configured to display a second collection of records of the second response data, the second user interface further configured to update the displayed aggregate information for the second information; and displaying the second user interface.

In some implementations, non-transitory computer storage media encoded with computer program instructions that, when executed by one or more processors, cause a computer device to perform operations. The operations include receiving and store formatted static data, the formatted static data recording information about malware generated during static analysis of malware; receiving and store formatted dynamic data, the formatted dynamic data recording information about malware generated during dynamic analysis of malware; receiving a first query; selecting first response data for the first query from the stored formatted static data and from the stored formatted dynamic data; generating a user interface containing the first response data, the user interface configured to display a collection of records of the first response data, each record containing a plurality of fields of information, the user interface further configured to display aggregate information the represents aggregations of the collection of records; displaying the user interface; receiving an indication of user selection of a plurality of the displayed fields of information; responsive to receiving the indication, automatically generating a second query that specifies a search request for additional records that contain fields having the same information as the user selected fields; responsive to automatically generating the second query, automatically selecting second response data for the second query from the stored formatted static data and from the stored formatted dynamic data; responsive to automatically selecting the second response data, updating the user interface to contain the second data, the updated user interfaced configured to display a second collection of records of the second response data, the second user interface further configured to update the displayed aggregate information for the second information; and displaying the second user interface.

Implementations can optionally include any, all, or none of the elements described above or the elements described in further detail below. The displayed aggregate information includes a pie graph that dynamically updates depending on records presented in the user interface. The user interface is animated to update the information displayed by the user interface. User selection of a plurality of the displayed fields of information comprises user clicking on the area of the displayed fields with a pointing input. Displaying the user interface comprises serving a webpage that, when rendered, causes the user interface to be displayed on a client machine.

The systems, devices, program products, and processes described throughout this document can, in some instances, provide one or more of the following advantages. Computer network security can be improved. For example, the technology of computer and network security can be improved by permitting disparate pieces of information to be more easily and more efficiently discovered-permitting more robust and comprehensive malware detection/prevention mechanisms to be implemented and/or for a shift from reactive malware detection to proactive malware prevention. Data in a database related to similar events can be found and used as the basis for new and/or revised searching in a way that exposes relevant information to users without the users having to actively generate such searches, which can assist users locating relevant information within a large amount of data.

Other features, aspects and potential advantages will be apparent from the accompanying description and figures.

DESCRIPTION OF DRAWINGS

Like reference symbols in the various drawings indicate like elements

DETAILED DESCRIPTION

Figure 1:
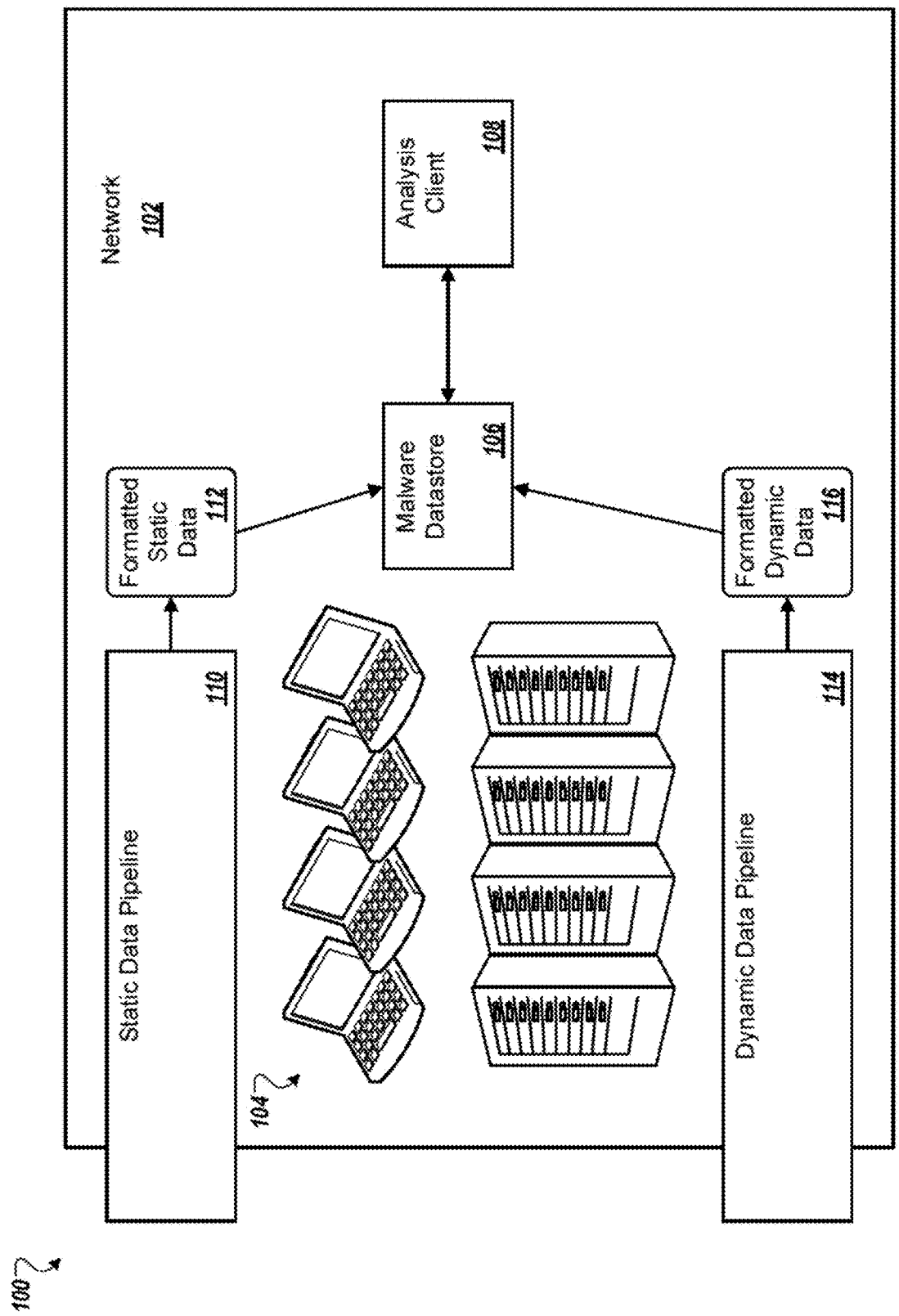
FIG. 1 is a block diagram of an example system for creating a database to record static and dynamic information about malware.

Systems and databases can be used to generate and store data related to malware for use by security systems and actors that are protecting a network or other computing resource. Such a database can collect and combine information from several different pipelines, such as a first pipeline providing static data and a second pipeline providing dynamic data. For example, the static and dynamic results can be combined into a single file that can be indexed. In other examples, static and dynamic results can stored separately (e.g., stored in separate files and indexed separately), but can be correlated with each other. The static data can include information learned about malware through static analysis (analysis of the malware and its contents) while the dynamic data can include information learned about malware through dynamic analysis (analysis of the malware during runtime).

Such a database can be built to include indices correlate the static data with the dynamic data (and vice versa). For example, some malware may be subjected to static analysis that is provided in a first dataset, such as first data streams, feeds, or pipelines. Then, in an unrelated analysis, the same or similar malware may be subjected to a dynamic analysis that is provided in a second dataset, such as second data streams, feeds, or pipelines. Even with access to streams of static and dynamic data about many types of malware, it can be difficult to match the static and dynamic data for a particular piece of malware. This document describes a database system that is designed to allow a user to draw this data together through the use of indices and search queries.

For example, individuals and/or groups, such as third party security groups (security operation centers (SOC)) and/or government agencies, can submit malware information to security services (e.g., VIRUSTOTAL) that aggregate and distribute malware information for analysis and other security uses. The malware information can include any of a variety of details about malware instances, which in some instances can include things such as the output of static analysis toolsets and/or rule sets that were used to detect/prevent/secure an environment from the malware instances. Such information can be used to analyze and identify malware instances, including using rule sets (and/or modifications thereof) that are being provided by the security services. This malware information can be provided as part of a third party's data feed that contains data about many types of malware. At a later time, a security analyst may discover that there has been an instance of an attempted attack on a network. Unbeknownst to the analyst, this may be the same malware that was analyzed by the third party security group, but the connection or relationship between the different malware attack on the network and the malware analyzed by the third party security group may not be readily apparent (e.g., static code across the malware instances may be different, but the dynamic runtime behavior of the malware instances may be similar). The analyst may make use of technologies described here to use information about the attack to seek out the related static data (if it exists) and to use the mix of static and dynamic data to gain a more holistic understanding of the attack and related malware.

To provide this functionality, the database can enforce data format constraints on the static and the dynamic data. These constraints can include listings of fields that must be included with data about malware. For example, static data may be required to include a malware name, an MD5 hash, a file name, or a unique identifier. Dynamic data may be required to include information such as date of execution, listings of sensitive files accessed, etc. In addition, both static and dynamic data may be required to include the same subset of fields for use in matching static and dynamic data about the same or similar malware. For example, a malware-classification field may be required, with optional values such as Trojan, dropper, file encrypted, etc. Use of this field can allow results to be returned that can be used in other queries, for example, such as through pipeline aggregations and/or other appropriate techniques. These techniques, along with other database querying, can allow a user to view some data and then quickly access data that may be related to the viewed data.

FIG. 1 is a block diagram of an example system 100 for creating a database to record static and dynamic information about malware. In the system 100, a network 102 is being protected by one or more security analysts. The security analysts are users that are tasked with monitoring the security state of the network 102 and to prevent malicious activity like malware execution, data exfiltration, etc.

The network 102 is, for example, a local network, intranet, virtual private network, or other data network used by an organization. The network 102 can include networking hardware such as cables, wireless access points, routers, gateways, firewalls, etc., that work together to allow resident machines 104 to communicate with other resident machines 104 and with computing resources outside of the network 102. The resident machines 104 can include, but are not limited to, personal computers, servers, and mobile devices.

Operations of the network 102 and resident machines 104 may come under attack from malicious actors—users and/or automated services that seek to exploit computing resources they do not own or have authorization to use. The security analysts can stop or attempt to stop these attacks through security countermeasures. These security countermeasures can include anti-malware applications running on the resident machines 104, edge security such as firewalls or gateway sandboxes, and behavior monitoring of the resident machines 104. A malware datastore 106 can be used to store information about malware, malware attacks, and related security incidents. The security analysts can use an analysis client 108 to query contents of the malware datastore 106 in order to search for correspondences, correlations, and other inferences between malware, malware attacks, etc.

To populate the malware datastore 106, the network 102 can use a static data pipeline 110 and a dynamic data pipeline 114 to generate formatted static data 112 and formatted dynamic data 116, respectively. Generally speaking, static data refers to data about malware that is created during static analysis of malware in which the malware is not executed. This information can include, for example, a hash of a file, a file name, a date first encountered, a compile-time stamp, etc. Dynamic data refers to data about malware that is created with execution of the malware. This information can include, for example, behavior signatures, files or network resources read or written to, behavior classifications, counter-security measures, etc.

The static data pipeline 110 collects, aggregates, and formats static data from one or more sources to create formatted static data 112. This may include, for example, collecting data from one or more external security vendors and one or more sources within the network 102. This data may take different format depending on the source of the static data, and the static data pipeline can reformat the data according to a predetermined data format to create the formatted static data 112. In this way, all of the static data, regardless of the source, can be made to conform to a single format.

The dynamic data pipeline 114 collects, aggregates, and formats dynamic data from one or more sources to create formatted dynamic data 114. This may include, for example, collecting data from one or more external security vendors and one or more sources within the network 102. This data may take different format depending on the source of the dynamic data, and the dynamic data pipeline can reformat the data according to a predetermined data format to create the formatted 116. In this way, all of the static and data, regardless of source, can be made to conform to a single format.

The static and dynamic formats may be different. For example, each format may list a collection of fields that must be in each record, but these fields may be different for the two different types of data. This may be due, for example, to the different types of fields that are appropriate for static and dynamic data. A subset of the fields may be the same in both formats. For example, a hash is often used to provide a fingerprint or identification value for malware files, and thus the same hash field may be in both formats.

The formatted static data 112 and formatted dynamic data 116 may be continuously created by the static data pipeline and dynamic data pipeline as input to the pipelines become available. As the formatted static data 112 and formatted dynamic data 116 is created, the malware datastore 106 can receive the data and continuously update its contents. Then, as search queries are received from the analysis client 108, the malware datastore 106 can provide up-to-date search results to the analysis client 108.

Figure 2:
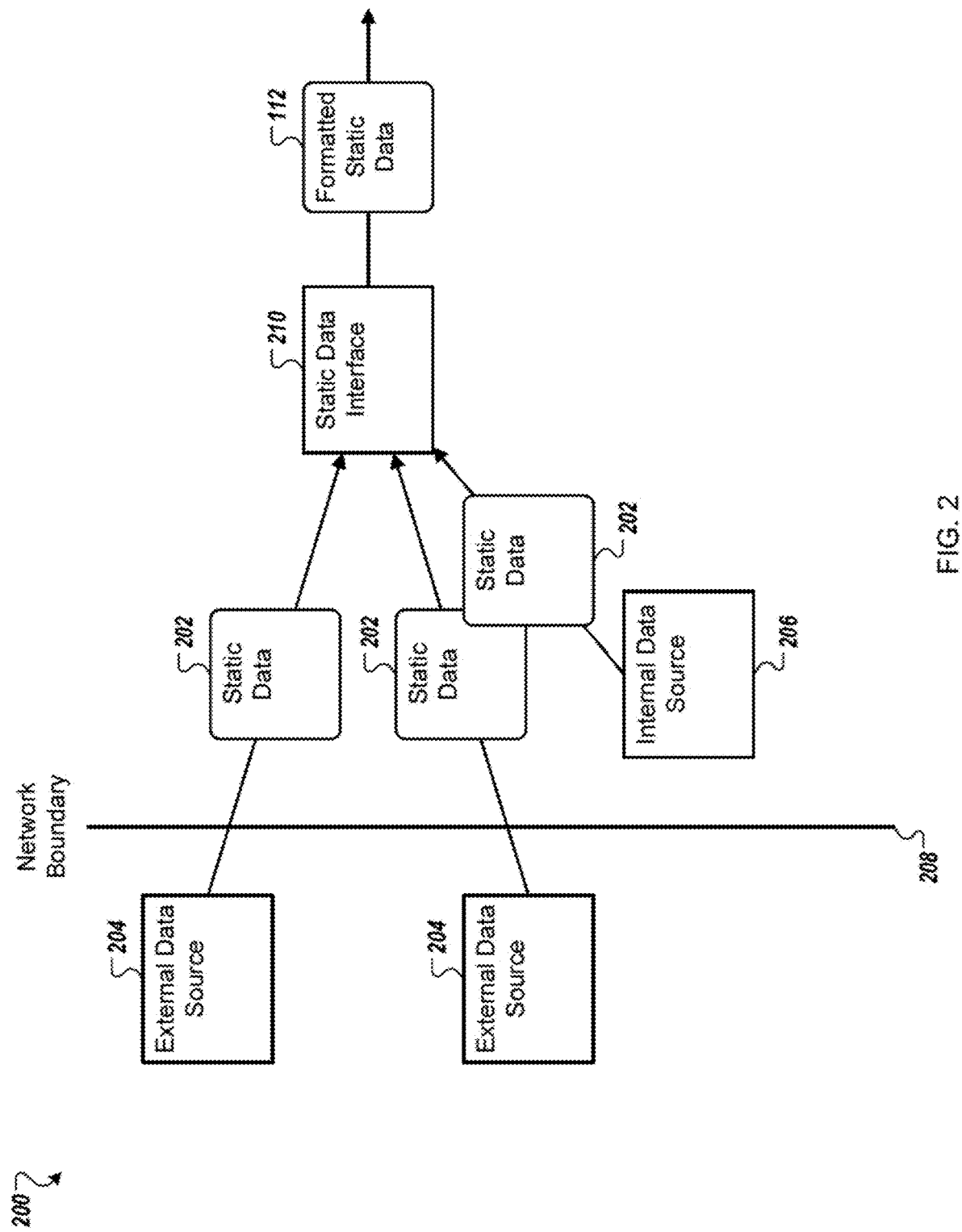
FIG. 2 is a block diagram of an example system for generating formatted static data.

FIG. 2 is a block diagram of an example system 200 for generating formatted static 112 data. The system 200 may be used, for example, to create the static data pipeline 110 discussed above by augmenting and enriching external data sources 204 providing static data 202, which can be combined with internal data sources 206 also providing static data 202 that can also be augmented and enriched. However, another system or systems may be used to create a static data pipeline 110. The system 200 can take the results that are provided by both the external data sources 204 and the internal data sources 206, and can format them into a schema (formatted static data 112) that can be readily used by security analysts to query and use through one or more user interfaces. The system 200 can provide one or more programmatic APIs that can perform one or more of these translations from the static data 202 into the formatted static data 112.

In the system 200, data from various data sources is collected. Generally speaking, these data sources provide subscribers with security information. This security information can include static data 202 about malware, threat intelligence, news items related to security issues, and the like. In some cases, the data sources provide this information for a fee such as a subscription fee. In some cases, the data sources provide this information for free to interested parties. In some cases, the data sources are owned and/or administered by the owner and/or administrator of the network 102 and provide this information in an effort to secure the network 102.

In the system 200, data from various data sources is aggregated. The data sources may be owned and/or administered by different parties. The data sources may provide the data along different communication channels such as email alerts, Rich Site Summary (RSS) feeds, etc. The system 200 can be configured to receive the information along any of these communication channels and then aggregate the information down to one unified communication channel.

In the system 200, data from various sources is formatted into a single common data format. The various data sources may provide their data according to one or more, or no, data formats that may or may not be shared by any other data format. The system 200 can translate data in these disparate formats into a single common format. This single common format may define, for each entry of information, a particular plurality of fields. For incoming data that is in a structured format (e.g., JavaScript Object Notation (JSON) or Extensible Markup Language (XML)) the system 200 can reformat the fields of the incoming data to match the defined format for static data. For incoming data that is unstructured (e.g., natural language) the system 200 can process the unstructured data to extract information needed for the fields of the defined format for static data.

The system 200 includes external data sources 204 and internal data sources 206. The external data sources are situated outside of a network, beyond a network boundary 208. Internal data sources 206 are situated on a network, within the network boundary 208. The network boundary 208 may be, for example, a boundary of the network 102. The external data sources may collect and provide static 202 about malware encountered outside of the network. For example, when a different network is attacked with malware, a security service may perform a static analysis of the malware and provide associated static data 202 to the system 200 as well as many other networks that subscribe to the security service. The internal data source 206 may run static analysis on malware discovered within the network boundary 208, for example malware that attacks resident machine 104.

Each of the external data sources 204 and the internal data source 206 can provide static data 202 to a static data interface 210. The static data 202 may come into the static data interface 210 along one or more different communication channels and formatted according to one or more different formats. As such, the static data interface 210 can be configured to receive data along different communication channels. The static data interface 210 can also be configured to reformat the static data 202 into a formatted static data 112 such that all the formatted static data 112 conforms to a single format. The formatted static data 112 can include information about malware generated during static analyses of malware performed outside of a network to be protected by the system, such as from external data sources 204. The formatted static data 112 can also or alternatively include information about malware generated during static analyses of malware performed inside of the network to be protected by the system, such as from internal data source 206.

Although a particular number and types of elements are shown in the system 200, it will be understood that different numbers and types of elements may be used to create the same or similar results. For example, more or fewer external data sources 204 and/or internal data sources 206 may be used, including no such information sources internal to the network or external to the network. Some of the static data 202 may come into the static data interface 210 already formatted according to the data format used by the formatted static data 112. In addition to the data format used by the formatted static data 112, some of the data may also be formatted according to one or more other data formats. Each element may be made of one or more sub-elements. For example, that static data interface 210 may include an input-module for each communication channel along which static data 202 comes in. The static data interface 210 may include one or more translation modules for translating different static data 202 into the formatted static data 112.

Figure 3:
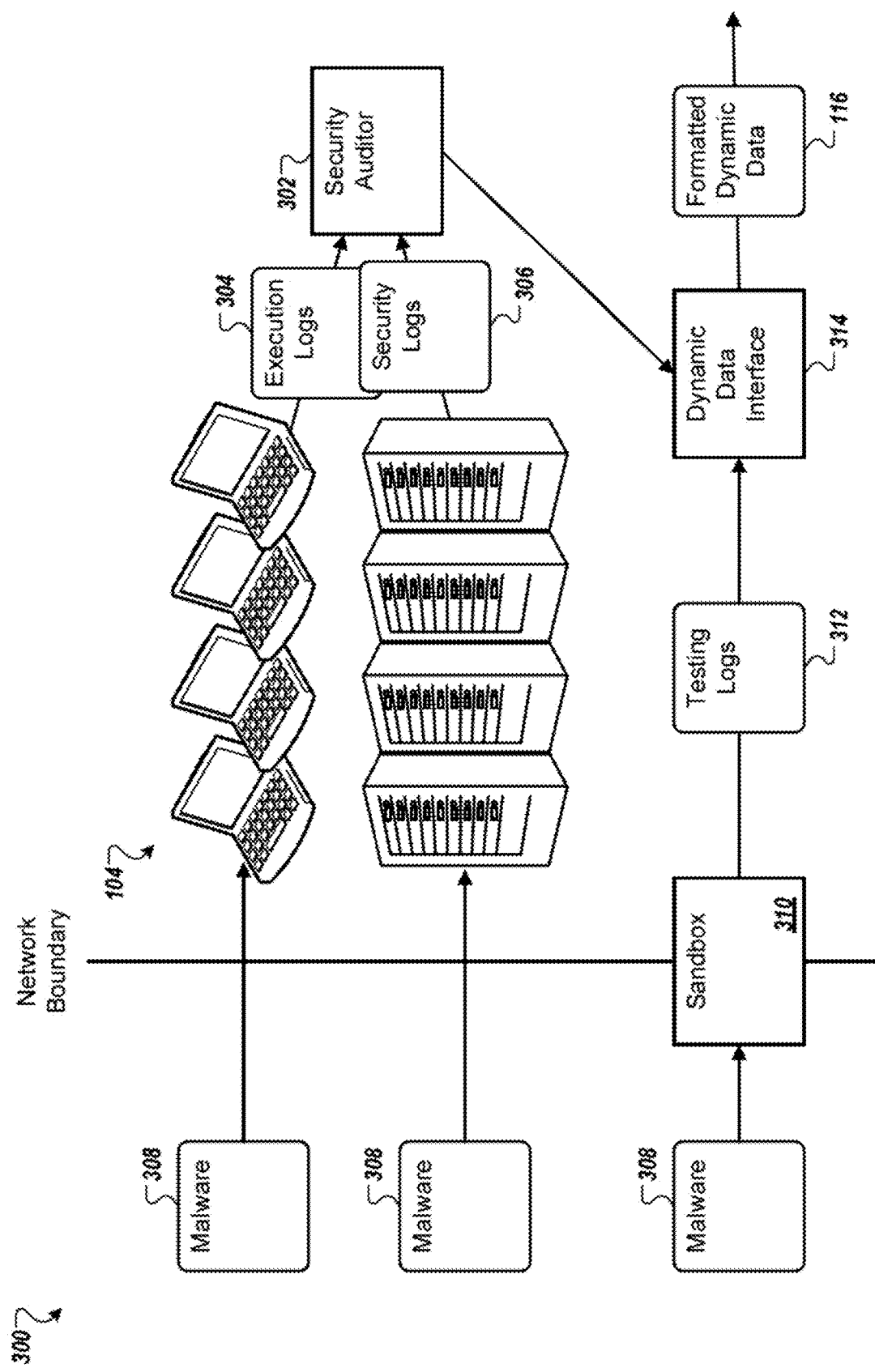
FIG. 3 is a block diagram of an example system for generating formatted dynamic data.

FIG. 3 is a block diagram of an example system 300 for generating formatted dynamic data 116. The system 300 may be used, for example, to create the dynamic data pipeline 114 discussed above. However, another system or systems may be used to create a dynamic data pipeline 116.

In the system 300, data from various data sources is collected. Generally speaking, these data sources provide information about the execution of applications, including or specifically malware applications. Execution includes, but is not limited to, the execution of binary files, interpretation of scripts, running macros, or the like. In some cases, these executions may be initiated specifically for the gathering of security information. In some cases, these executions may be initiated intentionally or accidentally but without intent to execute malicious behavior in malware. That is to say, the malware may be executed on purpose for security reasons, or by accident in the normal course of operation.

A security auditor 302 can operate to audit and enforce security policies of a network. For example, the security auditor 302 can provide a security analyst with a user interface to review activities within the network, schedule security tasks, etc. The security auditor can access logs from the resident machines 104 in order to gain access to information showing activities that the resident machines 104 have undertaken and/or are undertaking.

The security auditor 302 can access execution logs 304 from the resident machines 104. Execution logs 304 can contain information identifying execution of the resident machines 104. This execution can include malicious execution of malware 308 on resident machines 104. For example, the execution logs 304 may include information about access attempts to read data from hard disks, about data sent outside of the network boundary 208, etc.

In some cases, the security auditor 302 can examine the execution logs 304 in response to identifying the malicious execution. For example, a resident machine 104 can generate a security warning when an anti-malware application discovers a malware attack on itself. In another example, the security auditor 302 may sniff network traffic an identify communication indicative of a malware execution. In another example, the security auditor 302 can parse execution logs 304 and identify evidence of malicious execution within the execution logs 304.

Responsive to identifying the malicious execution, the security auditor 302 can access the execution logs 304 recording events related to the malicious execution. For example, the security auditor 302 can send a request to the resident machines 104 for the execution logs 304. For example, the security auditor 302 can receive execution logs 302 on a regular basis and then access the execution logs 302 from storage in response to identifying the malicious executions. In some cases, the resident machines 104 send, and/or the security auditor 302 can request, the execution logs 304 for other reasons or on other schedules.

The security auditor 302 can access security logs 306 from the resident machines 104. Security logs 306 can contain information identifying an attack on the network with malware 308. For example, the malware 308 may gain ingress onto a resident machine 104 on the network and be detected by one or more security countermeasures of the resident machine 104 or another system on the network. This may include, for example, a macro embedded within a document being detected before being loaded, a network sniffer identifying unexpected network traffic, or a monitor application identifying a failed unauthorized access of a sensitive data file. The security auditor 302 may make this identification, or receive a notification from another system that such an identification has been made.

Responsive to identifying the attack on the network with malware 308, the security auditor 302 can access security logs recording events related to the attack. For example, the security auditor 302 can send a request to the resident machines 104 for the security logs 306. For example, the security auditor 302 can receive security logs 306 on a regular basis and then access the security logs 306 from storage in response to identifying the attack. In some cases, the resident machines 104 send, and/or the security auditor 302 can request, the execution logs 304 for other reasons or on other schedules.

In general, identification of execution of malware involves identifying execution or attempted execution of malware, regardless of the cause of the execution. Identification of an attack, on the other hand, involves identification of actions taken to damage the network or place malware on the network. This can include communications containing malware, infiltration of data, impersonation of authorized users, etc.

The network can use edge protection schemes to prevent malware 308 or an attack from entering crossing the network boundary 208. For example, a sandbox 310 may be positioned on the network boundary 208 for the purposes of testing data as the data passes through the network boundary 208. For example, gateways of the network can receive messages with testable data and route the messages to the sandbox 310. The sandbox 310 can load data of the message into a sandboxed environment to test, one or more times, the behavior of the data and report back a result of the test. The network gateway can then decide to drop the message or pass the messages. In some cases, the sandbox 310 is operated in a device physically present in the same geographic location as the network gateway. In some cases, the sandbox 310 is a service provided by a third party provider with no physical presence with the gateway.

A dynamic data interface 314 can access testing logs 312 that contain the results of the tests by the sandbox 310. For example, responsive to the loading of the malware 308 into the sandbox environment, the dynamic data interface 314 can access the testing logs 312. For example, the dynamic data interface 314 can send a request to the sandbox 310 for the testing logs 312. For example, the dynamic data interface 314 can receive testing logs 312 on a regular basis and then access the testing logs 312 from storage in response to loading malware 308 into the sandbox. In some cases, the sandbox 310 can send, and/or the dynamic data interface 314 can request, the testing logs 312 for other reasons or on other schedules.

The dynamic data interface 314 can receive information related to dynamic testing of malware 308. The dynamic data may come into the dynamic data interface 314 along one or more different communication channels and formatted according to one or more different formats. As such, the dynamic data interface 314 can be configured to receive data along different communication channels. The dynamic data interface 314 can also be configured to reformat the incoming into a formatted dynamic data 116 such that all the formatted dynamic data 116 conforms to a single format. The formatted dynamic data 116 can include information about malware generated during dynamic analyses of malware performed outside of a network to be protected by the system. The formatted dynamic data 116 can also or alternatively include information about malware generated during dynamic analyses of malware performed inside of the network to be protected by the system.

Figure 4:
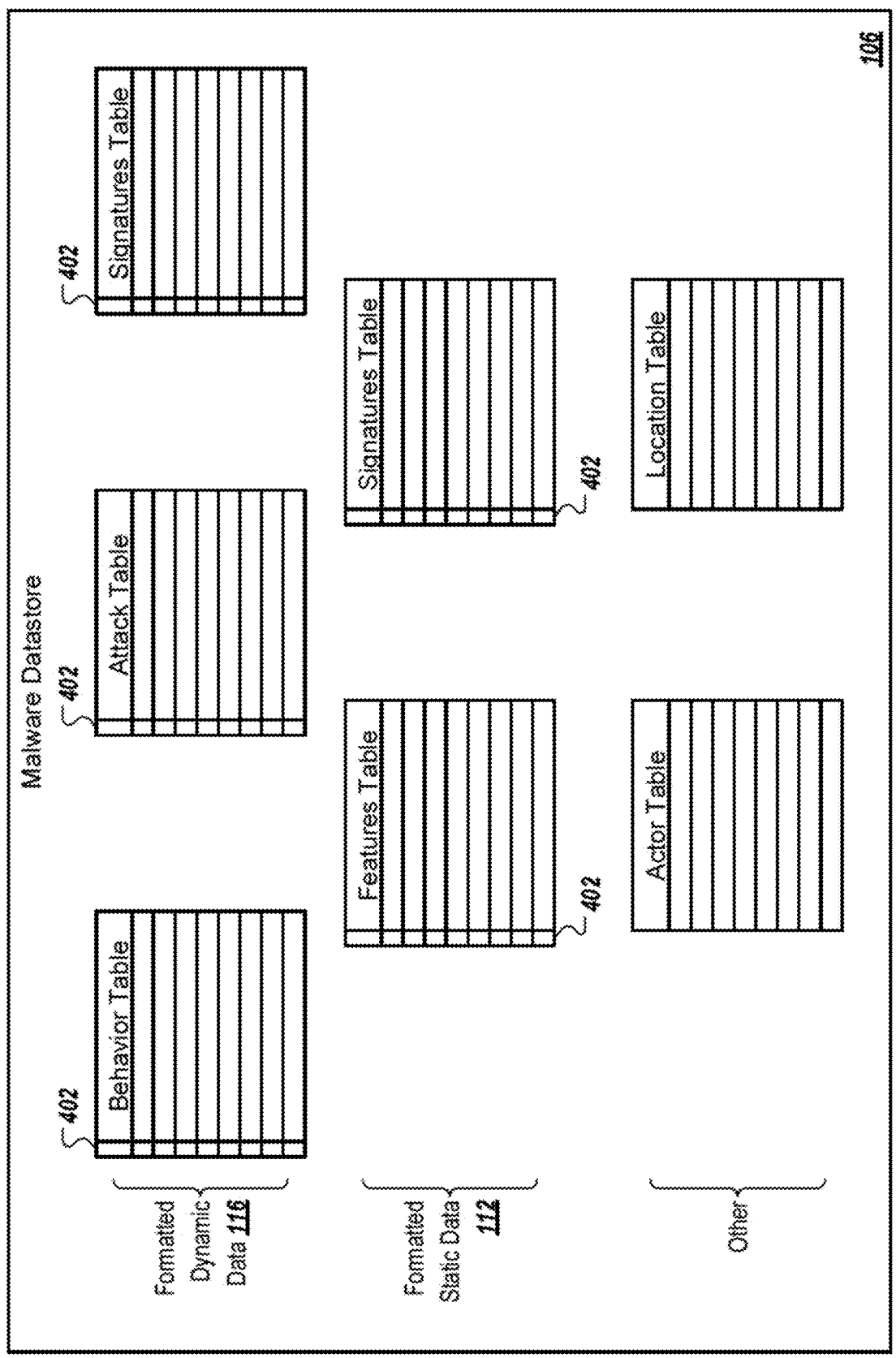
FIG. 4 is a schematic diagram of an example datastore for storing information about malware.

FIG. 4 is a schematic diagram of an example datastore 106 for storing information about malware. The malware datastore 106 can store the formatted static data 112, the formatted dynamic data 116, and other data for future use. For example, the malware datastore 106 can provide access to the stored data to clients such as the analysis client 108.

The malware database can store the formatted static data 112, the formatted dynamic data 116 in separated documents such as tables, objects, etc., that each contain one entry per malware entity or event, and each entry contains one or more records. For example, each entry may represent a single test, a single instance of malware, or a single attack.

Each entry of each document in the formatted static data 112 and the formatted dynamic data 116 can include index values 402 that uniquely identify the entry in the document. These indexes might be, for example, a hash of a file, a timestamp that a sandbox test was performed, etc. These index value need not explicitly identify a particular malware. For example, a particular malware may be permutated into a dozen different files each containing different code, thus having different hash values. As such, the index values alone do not identify all entries in a document related to the same malware. Instead, a security analyst can use the analysis client 108 to query the contents of the malware datastore 106 to identify correspondences, correlations, and other inferences from the data.

The index values can be specified in the first data format to which the formatted static data 112 complies and the second data format to which the formatted dynamic data 116 complies. In some cases, the formatted static data 112 and the formatted dynamic data 116 can include some of the same data in the indexes. For example, the first data format can comprise a first plurality of fields including a particular subset of fields. The second data format can comprise a second plurality of fields that is different from the first plurality of fields but that also include the particular subset of fields.

In some cases, the formatted static data 112 and the formatted dynamic data 116 include no similar data in their indexes. For example, the first and second data formats may contain no subset of similar records used to create indexes. Further, the different documents in the malware database 106 may in some cases share no data across indexes within the formatted static data 112 and/or within the formatted dynamic data 116. As such, the malware datastore 106 may be implemented as either a relational or non-relational database. In either case though, the indexes may be built and maintained, for example, to improve search speed and efficiency.

Figure 5:
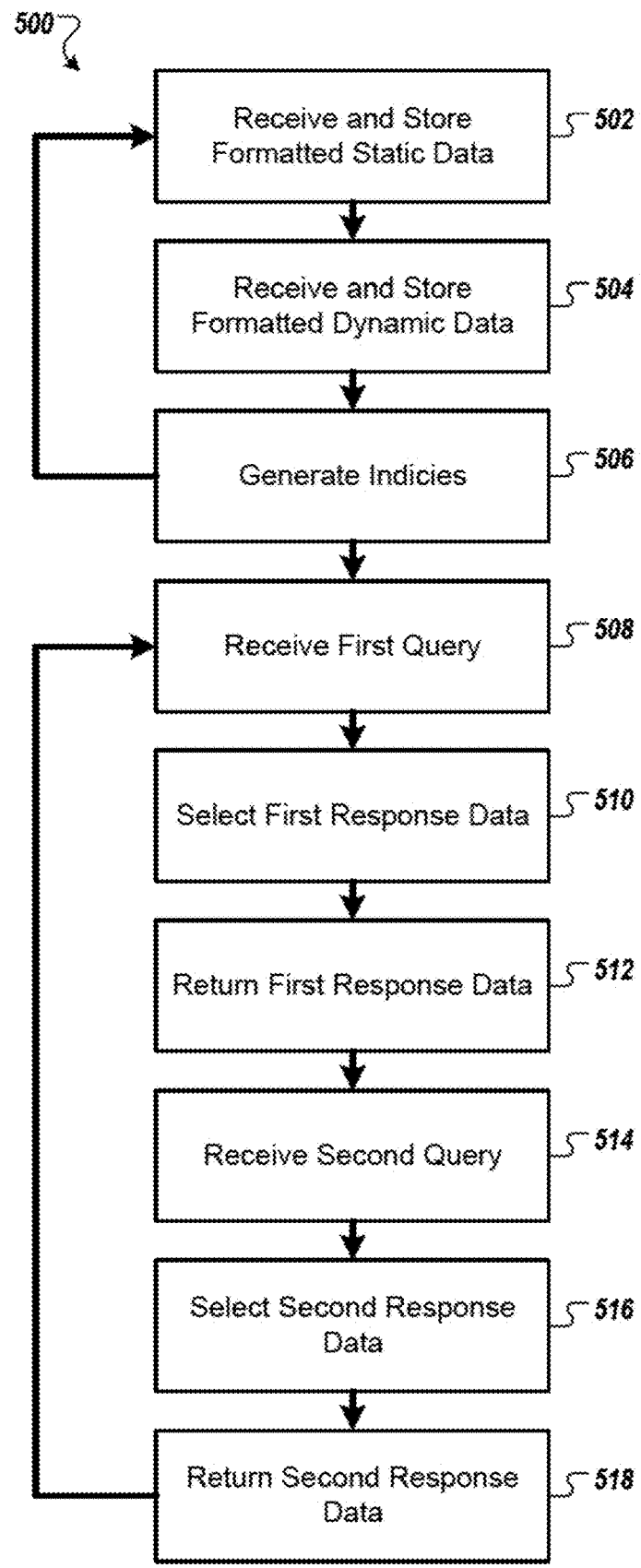
FIG. 5 is a flowchart of an example process for responding to queries about malware.

FIG. 5 is a flowchart of an example process 500 for responding to queries about malware. The process can be used, for example, by the malware datastore 106. As such, the description that follows will be described with reference to elements of the system 100. However, a different number, type, and configuration of elements can be used to perform the process 500 and/or a similar process.

In the process 500, the malware datastore 106 builds a set of data related to malware and malware attacks. Initially, structured data is received and stored. The malware datastore 106 then builds one or more indices that link together data entries that are or have been determined to be related to each other. These indices are then used, in part, to answer queries about data in the datastore 106 so that a security analyst can learn more about security incidents that affect a network the security analyst is analyzing.

Formatted static data is received and stored 502. For example, the malware datastore 106 can receive the formatted static data 112 from the static data pipeline 110. Formatted dynamic data is received and stored 504. For example, the malware datastore 106 can receive the formatted dynamic data 116

Indices that link stored formatted static data and stored formatted dynamic data that share similar properties are generated 506. For example, if various entries in the static and dynamic data contain identical values (e.g., identical hash values) or values near to each other (e.g., timestamp values within minutes of each other), an index can be created that links these entries together. In some cases, the creation of these indices may be user driven. Using information from the malware datastore 106, information from other sources, and their professional skills, a security analyst may determine that various entries in the malware datastore 106 are linked in some way. For example, malware entering the network over the course of weeks, but all with the same target and with file encryption behavior may be noticed by the security analyst. The security analyst may then decide that it is likely that all these entries are related to the same persistent threat. In the user interface of the analysis client 108, the security analyst may flag these entries as all part of a single attack and the malware datastore 106 can build an index linking these entries together.

Receiving data 502-504 and building indices 506 may occur on an ongoing basis. For example, the data from the pipelines can be received as it is available and added when received such that the data in the malware datastore 106 is constantly being updated. Similarly, the indices may be created on an ongoing basis. For indices created by fully-automated process, the indices may be built, for example, on a regular schedule, when new data becomes available, as security analysts create them, etc.

A first query is received 508. For example, an analyst using the analyst client 108 may provide user input that causes the analysis client 108 to issue a query to the malware datastore 106 to search and return some data. This query may take the form of a structured query language including, but not limited to, the Structured Query Language (SQL) or another appropriate language. The query may include one or more search parameters that define the search that should be performed by the malware datastore 106.

Using the indices, first response data for the first query is selected from the stored formatted static data and from the stored formatted dynamic data 510. For example, the malware datastore 106 may engage a query engine to parse the first query to extract the search parameters. The malware datastore 106 can then identify entries that match the search parameters and load those into a memory buffer to prepare them for returning.

To aid in this searching, the malware datastore 106 can use one or more indexes to find entries responsive to the query. For example, a query may search for any malware attacks in the last 24 hours. The malware datastore 106 may identify one attack that has a timestamp within the requested time window. The record for this attack may include, for example, the timestamp, a hash of the file used in the attack, a network identifier of the targeted resident machine 104, and a malware-type field (e.g., dropper). The record may also include data for an index that matches the entry for this attack to three other entries for attacks performed in the last month. These other attacks may have been identified, for example, based on a similar behavioral signature of the malware found during dynamic execution. Further, these four entries may each reference some entries of static data by way of the index. All of these related entries may be gathered by the malware datastore 106.

A first response for the first query is returned. The first response includes the first response data 512. For example, malware datastore 106 can collect all of the data identified for response and return that to the analysis client 108.

After returning the first response, a second query is received. The second query contains, as a search parameter, a subset of the first response data 514. For example, the security analyst may see the four instances of a dropper being targeted at the same resident machine 104 and become concerned that the network 102 is undergoing a persistent spearphishing attack on a computer used by a user with elevated permissions to some sensitive financial data. In such a case, the security analyst may select a small handful of the records returned and request a search on those records using the values in those records. For example, the second query may ask for instances of malware compiled at or near the same time as the malware used in those for attacks.

Using the indices and based on the search parameter, second response data for the second query is selected from the stored formatted static data and from the stored formatted dynamic data 516. For example, malware datastore 106 may use an index built on compile timestamps to quickly identify other attacks using malware compiled at the same time. A second response to the second query is returned. The second response includes the second response data 518. For example, the malware datastore 106 can return the entries related to the other attacks.

In some cases, the first response data comprises a plurality of entries, each entry comprising a plurality of records and the subset of the first response data used as the search parameter is some, but not all, of the plurality of records of the entries of the plurality of entries of the first response data. As shown in FIG. 4, the malware datastore 106 can store entries in the form of rows of tables. Each of these rows may be made of records stored as cells. The first response can include some entries (i.e. rows). The second query can call for an expanded search in which more and/or different rows are returned.

For example, a security analyst can use the first query to call up an entry about one particular file. The security analyst can see that the response to the query indicates the malware using a command-and-control server the analyst is not familiar with. The security analyst may then use the second query to call up, for example, all other malware that uses that command-and-control server, to see if there is anything to be learned from that group.

In some cases, the first response data comprises a plurality of entries, each entry comprising a plurality of records; and the second response data comprises a second plurality of records, at least some of the second plurality of records not included in the first plurality of records such that the second response returns information that was not included in the first response. For example, to perform the search on the command-and-control server, the security analyst may review the results of the first query. These results, made up of an entry for the file at issue with each entry containing a group of records, can be used as the basis of a second search. In such a case, the analyst may indicate that they wish to execute a search using one record of the entry, the command-and-control record. In addition, the analyst may also limit the search with one or more parameters (e.g., within a time window). These additional limits may be based on the first search results or newly entered by the security analyst.

After the second response is returned, the malware datastore can remain ready to answer more queries, and to receive more formatted data and build more indices. Indeed, the malware datastore 106 is capable of performing various actions simultaneously. For example, if in identifying data responsive to a query, a new correspondence is found, the malware datastore 106 can generate or update an index while preparing response data for the query.

By using the technology described in this document, correspondences found between malware data can be used to increase the search speed and efficiency of the malware datastore 106. This improvement to data storage and retrieval allows for technological improvements when particular domain-specific (i.e. security-type) data is available for use.

Figure 6:
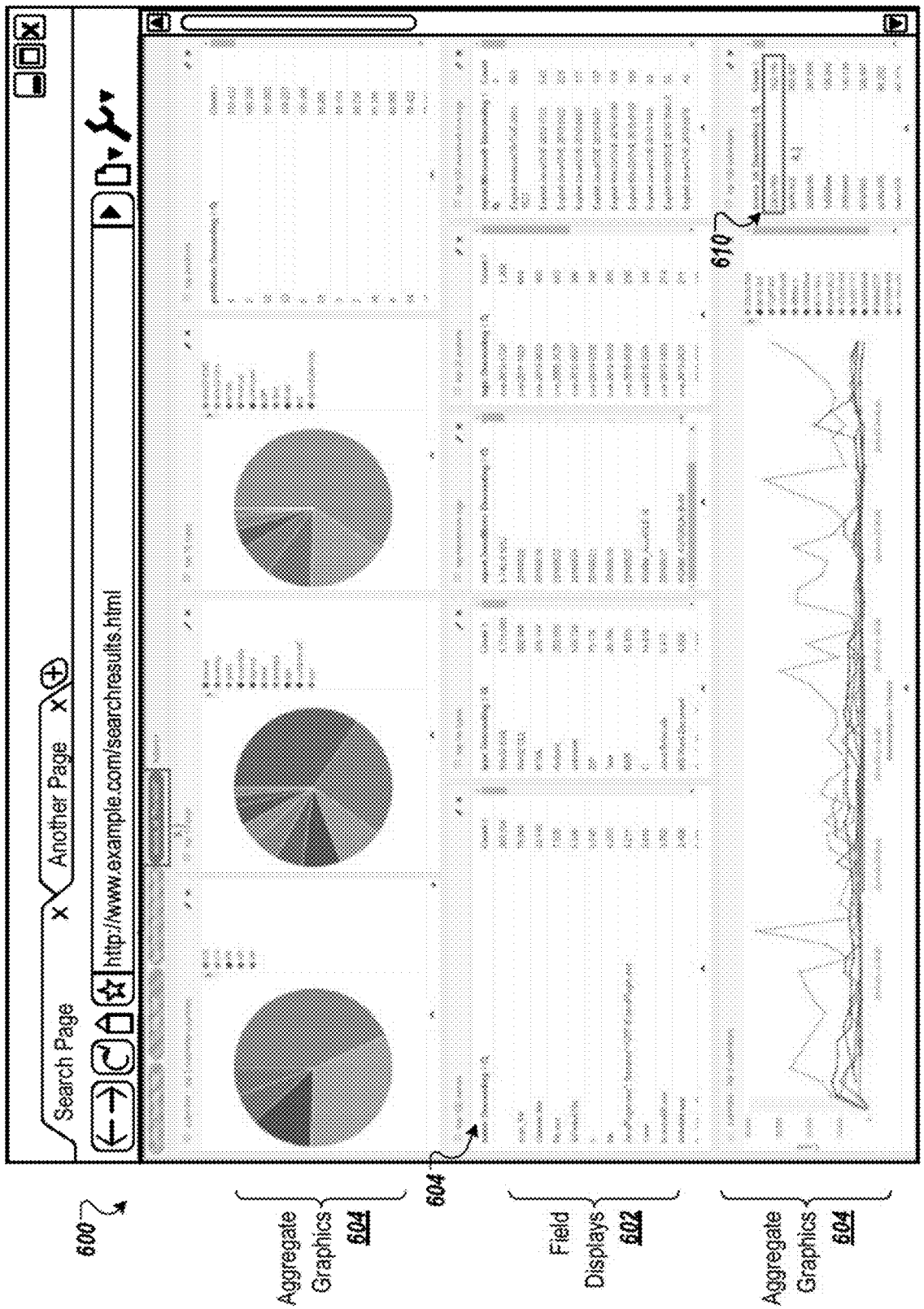
FIG. 6 is an example user interface to allow a user to pivot among information stored in a datastore that stores information about malware.

FIG. 6 is an example user interface 600 to allow a user to pivot among information stored in a datastore that stores information about malware. For example, the user interface 600 can be served as a webpage by the malware datastore 106 in order to make the information in the malware datastore 106 available to a user, or can be delivered in a different way.

The user interface can provide a user with information in a way that allows them to gain multiple views of the same data simultaneously in order to gain more context for understanding the data. As will be appreciated, information about malware events can be very complex, with each event having many dimensions of information that may risk overloading a user. In order to make the information more digestible to the user, the interface 600 present information in a variety of ways, allowing a user to focus on different representations of the data in order to understand the information.

For example, the display 600 can display a collection of records, with each record containing a plurality of fields displays 602 of information. Shown here is a user interface that is showing a particular collection of records of information. Each of those records is related to an attack on the network 102. For each attack, that is for each record, there are fields. Examples of those fields include a "name" field for the name of the file used in the attack, a "type" field for the type of the file, a "source_id" field for the source of the attack, etc. Some or all of these fields can be presented in field displays 602, with one field display 602 per field.

As shown, the fields of the records are not displayed in a table format in which each record is given one row and each field in the record is given one column entry. Instead, the field displays 602 are shown as ordered lists with the list contents being the entries of a single field across all of the displayed records. As a consequence, the first, second, third, etc. entries in the field displays 602 are not necessarily in the same record as the first, second, third, etc. entries in other field displays 602.

Instead, each display field 602 can be sorted by the user. For example, a display field can be sorted in ascending or descending order by a user that selects (e.g., clicks on, swipes) the "Descending" or "Ascending" label 604. When the system receives and indication that the user has made a selection, the label can switch from "Descending" to "Ascending" or vice-versa and the list can be sorted according to the new label. This sorting of one field display 602 can occur without a sorting change taking place to another field display 602.

By presenting the field displays 602 as independent lists of information, the user interface 600 can display information to a user in a more flexible way that allows for new and different combinations of information to be observed by the user. A use of the user interface 600 is to display malware information to a user in a way that allows the user to use their security expertise to identify trends, correlations, and other relationships in the information in order to generate hypotheses. This independent sorting supports the user in their hypothesis generation by displaying the lists independently so that the user can see relationships across both record and field values. By way of comparison, a display in a table format, where each record gets one row and each column is for a particular field does not offer this independent and thus new display to the user.

The user further displays aggregate information that represents aggregations of the collection of records in aggregate graphics 604. The aggregate graphics show a graphic with elements that are shaped, sized, colored, etc. according to aggregations of information in the field displays 602 or in unshown fields of records used to populate the field displays 602. For example, a pie chart can show the relative frequency of various values in one field of the records. In this example, a pie chart shows the relative frequency of the "type" field, and a corresponding field display 602 shows a list of values in the "type" field, sorted in descending order. In this example, a pie chart is showing aggregate information for a "submitter country" field, a field for which no field display 602 is showing a sorted list of values.

The system can receive user selection to allow a user to pivot from a view of a current information set to another information set. That is, the user interface 600 may be generated in response to a first query that specifies all records matching some logical test should be shown in the user interface 600. The user interface 600 can display those records as described above. A user may view this information and generate a hypothesis that some field values are potentially interesting or useful for finding trends, correlations, or other intelligence. In order to test this hypothesis, the system allows the user to pivot on those field values. This pivot involves allowing a user to select a set of field values and responsively running a new query on the datastore 106 for all records with the same or similar field values.

The user interface 600 can be updated to display the results of this new query to the user. With the new information made available, the user can begin to evaluate their hypothesis. For example, they may determine that there are not many other records in the pivot and they are not useful for gaining an understanding of the information in the datastore 106. Or they may determine that, though not numerous, these records are useful.

The pivoting process can be iterative, with a user pivoting to new information over and over again in an effort to gain understanding of the data. In this way, each new pivot result can form the basis of a new pivot to continue a search throughout the data.

Each pivot action can be displayed to the user using animation to update the user interface 600. This animation can include, for example, an update to aggregate graphic 604 in which an element changes from an old format to a new format. That is, the wedges of the pie graph can grow and shrink in order to show to the user how the information is changing. If the user pivots away from an information set with many entries of "US" in the "submitter countries" field to an information set with few entries of "US," the animation can show the "US" wedge shrinking while other wedges grow. Similarly, entries in the field display may move up and down in order to show the change in location of each entry. In the "type" field display, the Win32.EXE entry can move down in an animation to a new location if the new information set has fewer Win32.EXE type entries.

Figure 7:
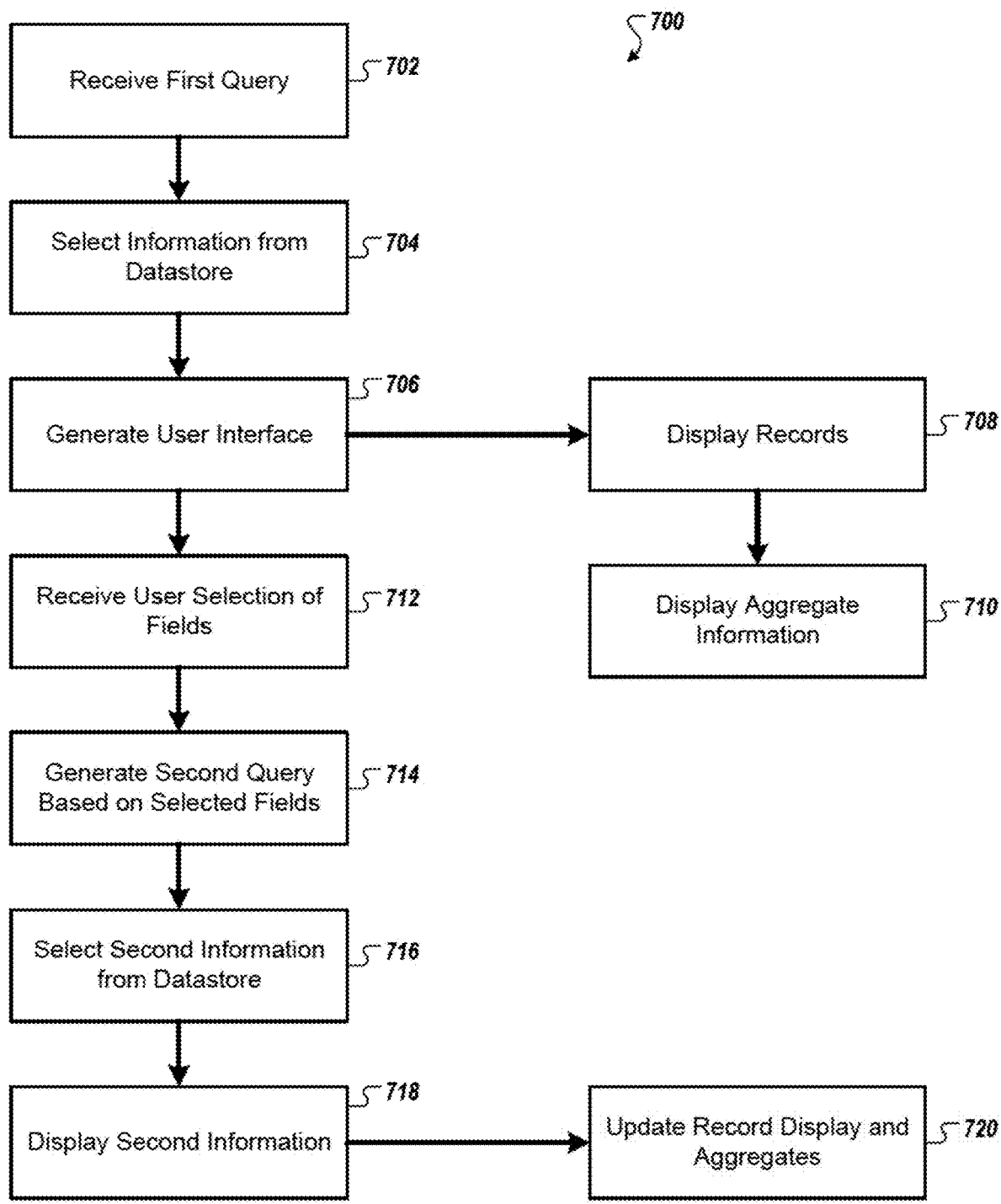
FIG. 7 is a flowchart of an example process for providing a user with a user interface for pivoting among information stored in a datastore that stores information about malware.

FIG. 7 is a flowchart of an example process 700 for providing a user with a user interface for pivoting among information stored in a datastore that stores information about malware. In the following example, a user is using the process 700 to interrogate a data store that is storing static and dynamic data related to security incidents on a network. The user in this example has just been made aware of a spearphising attack in which an outside attacker has been targeting unsophisticated users with personally crafted emails that contain malicious software. In order to defend the network, the user wishes to learn more about this spearphishing attack, and in order to do so is using the process 700 in an attempt to gather information about the spearphishing attack.

A first query is received (702). For example, the user has received an alert from the network that three emails containing malicious software were identified and quarantined within a one-minute window. Using this alert, the user generates a query for the three emails and their related data using unique identifiers for the emails.

Information is selected from a datastore (704). The selected data can include formatted static data and formatted dynamic data. The system receives the user's query that identifies three unique identifiers. In response, the system gathers data linked to those three unique identifies. This information includes metadata about the email such as date received, sending address, etc. The system also gathers related information such as geographic information related to servers known to be associated with the domain of the sending address. Examples of dynamic information gathered can include data generated when the malicious software was executed to test for maliciousness.

A user interface is generated (706). In order to generate the user interface, the system can produce code that, when executed, causes the user interface to be displayed. For example, the system can access a template for the user interface and populate that template with the gathered information, or with information created based on the gathered information (e.g., an aggregate that counts the number of times a particular value is found).

In the user interface, records are displayed (708). Each records contains a plurality of fields of information. These records can be shown in one or more elements of the user interface. For example, record displays may show an ordered list of values. In the user interface, aggregate information is displayed (710). The aggregate information represents aggregations of the collection of records. For example, a line chart can show the number of occurrences of an event per unit of time.

In this example, the collected records can be used to complete a template and generate code for a webpage. This webpage can be transmitted to a client device used by the user. When received, the client device can render the webpage in a browser window in order to display the user interface to the user.

With the user interface displayed, the user may examine the information provided and decide that it is possible that the spearphising campaign might have included a few exploratory emails before the emails with malicious software were sent. In order to see if there were any such exploratory emails, the user may decide that they wish to see all the emails from the same domains as the three that were flagged.

A user selection of fields is received (712). The user can click on the display elements showing the addresses from which the emails were received and may click on a time window of two weeks in the past. A second query is generated based on the selected fields (714). The second query specifies a search request for additional records that contain fields having the same information as the user selected fields. In this case, the second query can specify the address and the time window specified by the user.

Second information is selected from the datastore (716). The second information is selected from formatted static data and from formatted dynamic data. In this case, the second information includes five more emails that match the criteria specified by the user. Information about these five emails, and related information, is collected.

Second information is displayed (718). The system can update the user display by generating an update to the webpage with the second information. This update may take the form of a new webpage, new data to be displayed in the same webpage, etc. The update can include instructions to animate the change so that the change in data appears to move and shift on the screen for the user. The record display and aggregates are updated (720) according to the update.

Figure 8:
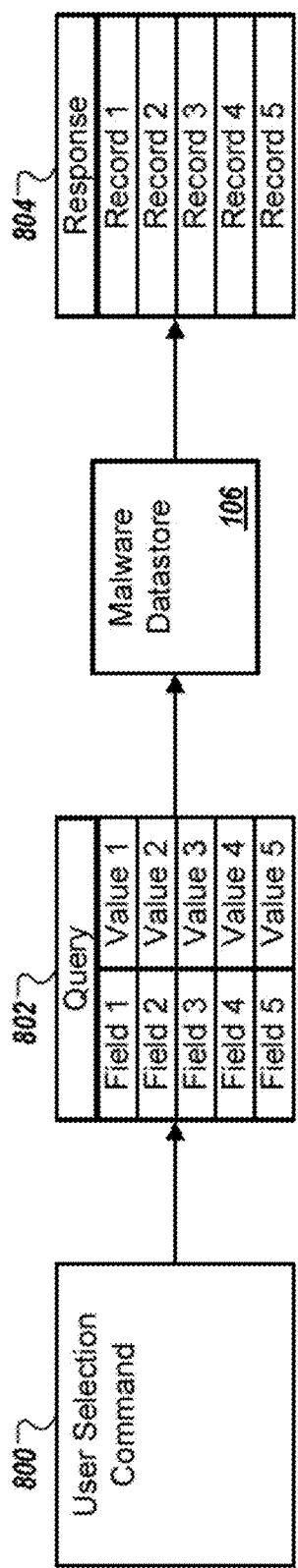
FIG. 8 is a schematic diagram of example query objects and reply objects that pivoting among information stored in a datastore that stores information about malware.

FIG. 8 is a schematic diagram of example query objects and reply objects that pivoting among information stored in a datastore that stores information about malware.

A user selection command 800 is a data object that can be used to record and transmit a record of a user interaction with a user interface. The selection command 800 can be a structured data object containing data about how a user has interacted with a user interface. For example, for a click event, the user selection command can include data about where a pointing device was when it was clicked, what interface element was under the pointing device when the user clicked, etc. The user selection command 800 may include a record of multiple user interactions. For example, if a user clicks on three fields, the user selection command 800 can include data recording all three of those clicks. The user selection command 800 can take the form of, for example, a structured data object that complies with one or more protocols such as the JavaScript Object Notation (JSON) or eXtensible Markup Language (XML).

A query 802 is a data object that can be used to specify a group of records requested by a user device. For example, the query 802 can be a query containing code that complies with a query language in order to specify a logical test. Examples of query languages include but are not limited to the Structured Query Language (SQL) and XQuery. The query 802 can include, for example, a plurality of fields, and values for each field that should be matched in a search. This matching may be exact (e.g., only an equal value is counted as a match) or fuzzy (e.g., a similar value may be counted as a match).

A response 804 is a data object that can be used to contain data that is responsive to the query 802. The response may include, for example, a list of records having a field or fields that match the values specified in the query 802. The response 804 can take the form of, for example, a structured data object that complies with one or more protocols such as the JavaScript Object Notation (JSON) or eXtensible Markup Language (XML).

Figure 9:
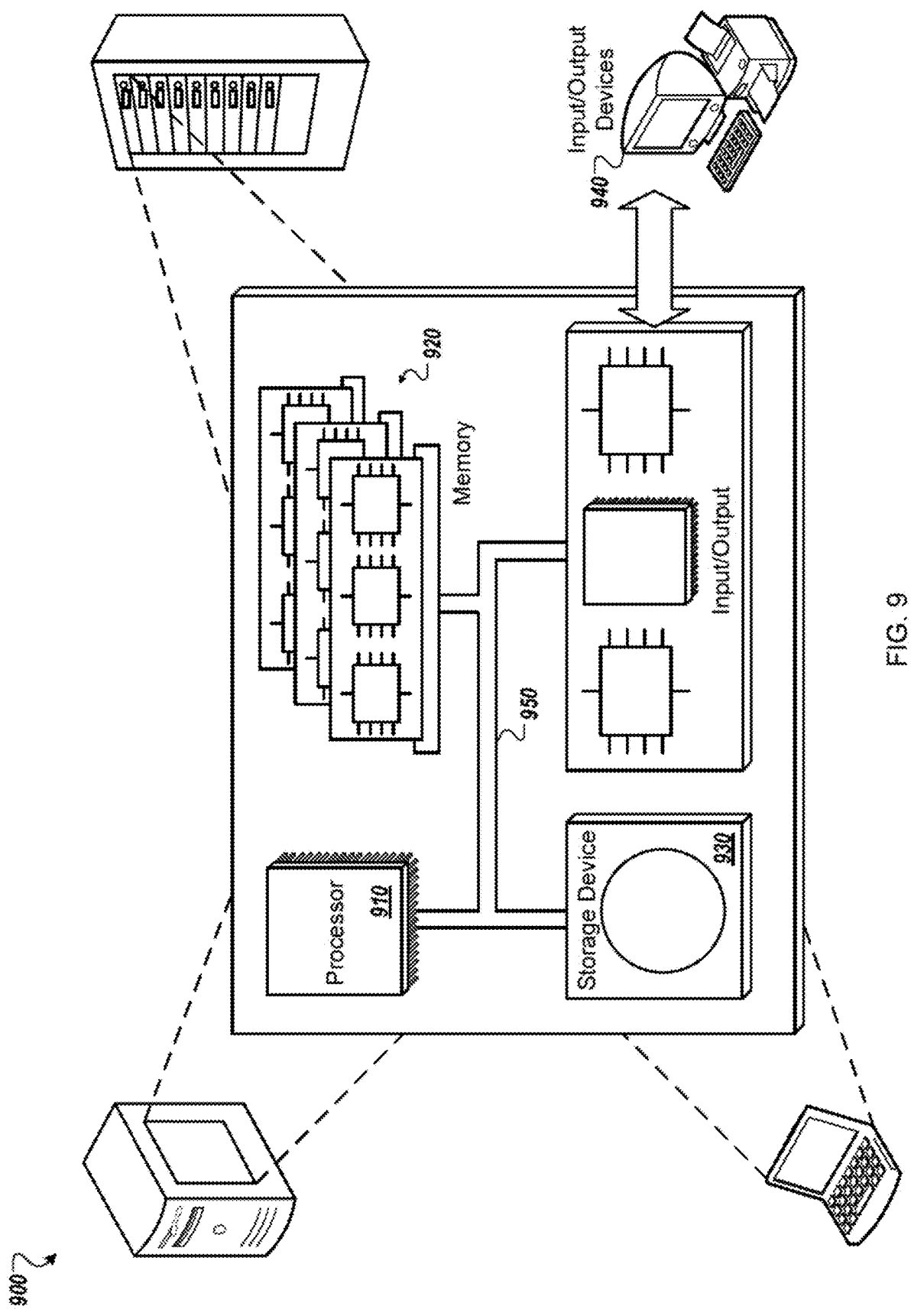
FIG. 9 is a schematic diagram that shows an example of a computing device and a mobile computing device.

FIG. 9 is a schematic diagram that shows an example of a computing system 900. The computing system 900 can be used for some or all of the operations described previously, according to some implementations. The computing system 900 includes a processor 910, a memory 920, a storage device 930, and an input/output device 940. Each of the processor 910, the memory 920, the storage device 930, and the input/output device 940 are interconnected using a system bus 950. The processor 910 is capable of processing instructions for execution within the computing system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the computing system 900. In some implementations, the memory 920 is a computer-readable medium. In some implementations, the memory 920 is a volatile memory unit. In some implementations, the memory 920 is a non-volatile memory unit.

The storage device 930 is capable of providing mass storage for the computing system 900. In some implementations, the storage device 930 is a computer-readable medium. In various different implementations, the storage device 930 may be a floppy disk device, a hard disk device, an optical disk device, or a tape device.

The input/output device 940 provides input/output operations for the computing system 900. In some implementations, the input/output device 940 includes a keyboard and/or pointing device. In some implementations, the input/output device 940 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet. The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system generating user interfaces, the system comprising one or more processors and a memory storing instructions to process:
a datastore configured to:
receive and store formatted static data, the formatted static data recording information about malware generated during static analysis of malware;
receive and store formatted dynamic data, the formatted dynamic data recording information about malware generated during dynamic analysis of malware;
receive a first query;
select first response data for the first query from the stored formatted static data and from the stored formatted dynamic data;
generate a user interface containing the first response data, the user interface configured to display a collection of records of the first response data, each record containing a plurality of fields of information, the user interface further configured to display aggregate information that represents aggregations of the collection of records;
display the user interface;
receiving an indication of user selection of a plurality of the displayed fields of information;
responsive to receiving the indication, automatically generate a second query that specifies a search request for additional records that contain fields having the same information as the user selected fields;
responsive to automatically generating the second query, automatically select second response data for the second query from the stored formatted static data and from the stored formatted dynamic data;
responsive to automatically selecting the second response data, update the user interface to contain the second data, wherein the updated user interface is a second user interface configured to display a second collection of records of the second response data, the second user interface further configured to update the displayed aggregate information for the second information; and
display the second user interface.

2. The system of claim 1, wherein the displayed aggregate information includes a pie graph that dynamically updates depending on records presented in the user interface.

3. The system of claim 1, wherein the user interface is animated to update the information displayed by the user interface.

4. The system of claim 3, wherein user selection of a plurality of the displayed fields of information comprises user clicking on the area of the displayed fields with a pointing input.

5. The system of claim 1, wherein displaying the user interface comprises serving a webpage that, when rendered, causes the user interface to be displayed on a client machine.

6. A method performed by data processing apparatuses, the method comprising:
receiving and store formatted static data, the formatted static data recording information about malware generated during static analysis of malware;
receiving and store formatted dynamic data, the formatted dynamic data recording information about malware generated during dynamic analysis of malware;
receiving a first query;
selecting first response data for the first query from the stored formatted static data and from the stored formatted dynamic data;
generating a user interface containing the first response data, the user interface configured to display a collection of records of the first response data, each record containing a plurality of fields of information, the user interface further configured to display aggregate information that represents aggregations of the collection of records;
displaying the user interface;
receiving an indication of user selection of a plurality of the displayed fields of information;
responsive to receiving the indication, automatically generating a second query that specifies a search request for additional records that contain fields having the same information as the user selected fields;
responsive to automatically generating the second query, automatically selecting second response data for the second query from the stored formatted static data and from the stored formatted dynamic data;
responsive to automatically selecting the second response data, updating the user interface to contain the second data, wherein the updated user interface is a second user interface configured to display a second collection of records of the second response data, the second user interface further configured to update the displayed aggregate information for the second information; and
displaying the second user interface.

7. The method of claim 6, wherein the displayed aggregate information includes a pie graph that dynamically updates depending on records presented in the user interface.

8. The method of claim 6, wherein the user interface is animated to update the information displayed by the user interface.

9. The method of claim 8, wherein user selection of a plurality of the displayed fields of information comprises user clicking on the area of the displayed fields with a pointing input.

10. The method of claim 6, wherein displaying the user interface comprises serving a webpage that, when rendered, causes the user interface to be displayed on a client machine.

11. A non-transitory computer storage media encoded with computer program instructions that, when executed by one or more processors, cause a computer device to perform operations comprising:
receiving and store formatted static data, the formatted static data recording information about malware generated during static analysis of malware;
receiving and store formatted dynamic data, the formatted dynamic data recording information about malware generated during dynamic analysis of malware;
receiving a first query;
selecting first response data for the first query from the stored formatted static data and from the stored formatted dynamic data;
generating a user interface containing the first response data, the user interface configured to display a collection of records of the first response data, each record containing a plurality of fields of information, the user interface further configured to display aggregate information that represents aggregations of the collection of records;
displaying the user interface;
receiving an indication of user selection of a plurality of the displayed fields of information;

responsive to receiving the indication, automatically generating a second query that specifies a search request for additional records that contain fields having the same information as the user selected fields;

responsive to automatically generating the second query, automatically selecting second response data for the second query from the stored formatted static data and from the stored formatted dynamic data;

responsive to automatically selecting the second response data, updating the user interface to contain the second data, wherein the updated user interface is a second user interface configured to display a second collection of records of the second response data, the second user interface further configured to update the displayed aggregate information for the second information; and displaying the second user interface.

12. The non-transitory computer storage media of claim 11, wherein the displayed aggregate information includes a pie graph that dynamically updates depending on records presented in the user interface.

13. The non-transitory computer storage media of claim 11, wherein the user interface is animated to update the information displayed by the user interface.

14. The non-transitory computer storage media of claim 13, wherein user selection of a plurality of the displayed fields of information comprises user clicking on the area of the displayed fields with a pointing input.

15. The non-transitory computer storage media of claim 11, wherein displaying the user interface comprises serving a webpage that, when rendered, causes the user interface to be displayed on a client machine.

* * * * *